Figures 1, 2, 3:
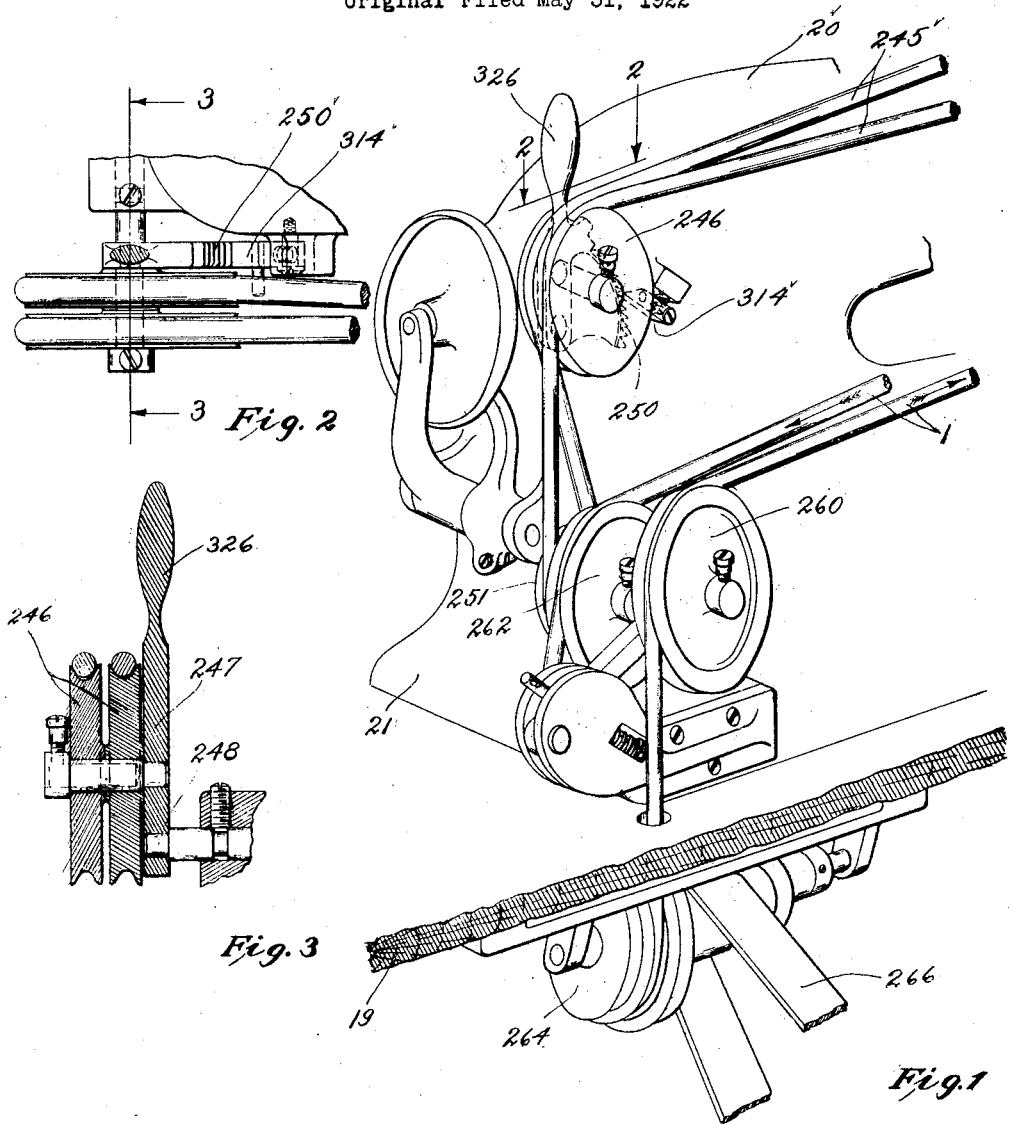

Oct. 25, 1932.   A. R. RIDDERSTROM   1,884,246
BELT TIGHTENER
Original Filed May 31, 1922

Inventor
Andrew R. Ridderstrom
By David Rines
Attorney

Patented Oct. 25, 1932

1,884,246

UNITED STATES PATENT OFFICE

ANDREW R. RIDDERSTROM, OF NAHANT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY

BELT TIGHTENER

Original application filed May 31, 1922, Serial No. 564,718, now Patent No. 1,721,046. Divided and this application filed November 23, 1923. Serial No. 676,646.

The present invention relates to belt tighteners. It will be understood that the invention is not restricted to use in any particular machine, but consists of the improved belt tightener a preferred embodiment of which is hereinafter described, illustrated in the accompanying drawings and defined in the appended claims.

The nature and the object of the invention will be readily understood from the following description, taken in connection with the accompanying drawing, in which Fig. 1 is a rear perspective view illustrating the invention in its preferred form; Fig. 2 is a plan view of a detail, partly in section upon the line 2—2 of Fig. 1, looking in the direction of the arrows; and Fig. 3 is a section taken upon the line 3—3 of Fig. 2, looking in the direction of the arrows.

The invention is, for convenience, described herein and illustrated in the accompanying drawing as embodied in a machine for skiving the margins of sheet stock, like shoe uppers.

Skiving machines are usually provided with a skiving knife for cutting a scarf in the margin of the stock, a grinder therefor, and feed mechanism for advancing the stock to the knife. These are not illustrated in the accompanying drawing, because unnecessary to an understanding of the present invention. It is sufficient to illustrate the frame 20 of the machine, provided with a base portion 21 that is bolted or otherwise secured to a bench or the like 19. The construction of machines of this character is well understood by persons skilled in the art, but reference may be had for a fuller understanding of the illustrative machine to a patent to Andrew R. Ridderstrom, No. 1,721,053, granted July 16, 1929. The present application is a division of application Serial No. 564,718, now Patent No. 1,721,046, also granted July 16, 1929. As is therein fully disclosed, the knife is directly driven by a belt 1 that passes over idler pulleys 260 and 262, in the direction of the arrows, and over a cone pulley 264 that may be driven from any suitable source of power by a belt 266.

A pulley 251, that is fast to the pulley 262, serves as a source of driving power for the grinder (not shown). The grinder is driven by a belt 245 that passes from the pulley 251, over idler pulleys 246. In order that the belt 245 may be tightened or loosened, as desired, the idler pulleys 246 are made adjustable. To this end, they are rotatably mounted upon a bracket 247 that is pivoted to the frame 20 of the machine at 248. In order that the bracket 247 may be held in pivotally adjusted position, it is rigidly provided with a catch. The catch is shown in the form of a ratchet 250 the teeth of which are adapted to engage a spring-pressed pawl 314. The bracket 247 is provided with a handle 326, whereby it may be manually pivoted about the pivotal point 248 when it is desired to tighten the belt 245, the pawl 314 engaging the teeth of the ratchet 250 to maintain the bracket in adjusted position. It is possible to actuate the bracket 247 in the opposite direction, to release the tension in the belt 245, by first pressing with the fingers upon the pawl 314, in opposition to the action of its spring. The bracket 247 will thereupon fall, by gravity, about its pivotal point 248, carrying with it the pulleys 246, and rendering the belt-tightener ineffective.

The description of many portions of the machine an understanding of which is not essential to an understanding of the present invention has purposely been omitted, and many parts of the machine have purposely not been illustrated, in order not to distract the attention from the features of essential novelty. Fuller explanation of such portions of the machine will be found in the patents referred to above. It will be clear that the features of novelty may be embodied in other machines, and in machines of other types, and that modifications may be made therein, by persons skilled in the art, without departing from the spirit and scope of the invention, as defined in the appended claims.

What is claimed is:—

1. A machine of the class described having, in combination, a pulley, a bracket having an idler pulley and a handle, a belt mounted over the pulleys, the handle being adapted to adjust the bracket in order that the idler pulley may serve as a tightener for the belt, a ratchet rigidly connected with the idler pulley, a pawl adapted to be engaged by the teeth of the ratchet to lock the bracket in adjusted position, and a spring for releasably maintaining the pawl engaged with the ratchet.

2. A machine of the class described having, in combination, a frame having a bracket pivot and a pulley pivot, a bracket pivoted about the bracket pivot, a pulley pivoted about the pulley pivot, the bracket having a handle, a fixed pivot and a curved ratchet, the ratchet being rigid with the bracket and being curved substantially along a circular arc about the bracket pivot as a center, idler pulleys rotatable about the fixed pivot, a belt mounted over the pulleys, the handle being adapted to adjust the bracket pivotally upward about the bracket pivot in order that the idler pulleys may serve as a tightener for the belt, a pawl positioned adjacent to the path of travel of the curved ratchet so as to be adapted to be engaged by the teeth of the curved ratchet to lock the bracket in adjusted position, and a spring for releasably maintaining the pawl engaged with the ratchet, the bracket being adapted to fall pivotally downward about the bracket pivot when the pawl is released from engagement with the teeth of the ratchet, thereby rendering the belt tightener ineffective.

In testimony whereof, I have hereunto subscribed my name this 16th day of November, 1923.

ANDREW R. RIDDERSTROM.